US006775019B1

(12) United States Patent
Sakurai et al.

(10) Patent No.: US 6,775,019 B1
(45) Date of Patent: *Aug. 10, 2004

(54) PRINTER HAVING A PLURALITY OF LOGICAL PRINTERS THEREIN AND HAVING A CONTROL UNIT WHICH CONTROLS THE LOGICAL PRINTERS SO AS TO PRINT A VIRTUAL PRINTING PROCESS OF ONE PAGE AT A TIME, THUS ACTUALLY PRINTING DATA FOR A SINGLE PAGE

(75) Inventors: Kazuhiko Sakurai; Kazuo Yokoyama, both of Kawasaki (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 154 days.

(21) Appl. No.: 08/444,517

(22) Filed: May 19, 1995

(30) Foreign Application Priority Data

Sep. 20, 1994 (JP) .............................................. 6-225335

(51) Int. Cl.[7] .............................................. B41B 1/00
(52) U.S. Cl. ..................................... 358/1.15; 358/1.13
(58) Field of Search ................................. 392/101, 109, 392/112, 114, 116, 117, 164; 358/402, 403, 296

(56) References Cited

U.S. PATENT DOCUMENTS

| 4,965,771 A | * | 10/1990 | Morikawa et al. ........... 395/112 |
| 5,075,874 A | * | 12/1991 | Steeves ....................... 395/112 |
| 5,274,461 A | * | 12/1993 | Mitsuhashi ................. 358/296 |
| 5,299,296 A | * | 3/1994 | Padalino et al. ............ 395/112 |
| 5,303,336 A | * | 4/1994 | Kageyama et al. ......... 395/114 |
| 5,371,837 A | * | 12/1994 | Kimber et al. .............. 395/114 |
| 5,467,434 A | * | 11/1995 | Hower, Jr. et al. ......... 395/114 |
| 5,511,149 A | * | 4/1996 | Hayano ....................... 395/112 |
| 5,559,933 A | * | 9/1996 | Boswell ...................... 395/114 |
| 6,047,111 A | | 4/2000 | Sugiura et al. |

FOREIGN PATENT DOCUMENTS

| JP | 03-149617 | 6/1991 |
| JP | 04-190442 | 7/1992 |
| JP | 05-155110 | 6/1993 |
| JP | 06-004234 | 1/1994 |
| JP | 06-161684 | 6/1994 |
| WO | WO 94/153300 | 7/1994 |

OTHER PUBLICATIONS

Complete English language Translation of Office Action from the Japanese Patent Office in the counterpart Japanese Patent Application (JP Application No. HEI 6–225335) mailed Apr. 17, 2001.

* cited by examiner

*Primary Examiner*—Gabriel I. Garcia
(74) *Attorney, Agent, or Firm*—Staas & Halsey LLP

(57) ABSTRACT

The present invention relates to a printer that can print effectively print requests from plural terminals. The printer includes a print execution unit and a control unit for controlling the operation of the print execution unit. The control unit controls the operation of the print execution unit in response to an external print request to perform a printing operation. The control unit also includes plural logical printers each which performs a virtual printing process corresponding to plural jobs. The control unit controls the operation of the print execution unit when each of the logical printers has completed a virtual printing operation for the page, and thus prints actually data for one page. The printer is applicable to a remote printer which prints in response to a print request from a terminal via a network such as a LAN.

19 Claims, 17 Drawing Sheets

36A: PROTOCOL IDENTIFYING UNIT
36B: PROTOCOL PROCESSING UNIT

| HEADER | LAN HEADER | | | DATA | |
|---|---|---|---|---|---|
| | ADDRESS TO BE TRANSFERRED | TRANSFER SOURCE ADDRESS | PROTOCOL IDENTIFICATION CODE | LOGICAL PRINTER IDENTIFICATION CODE | --- |

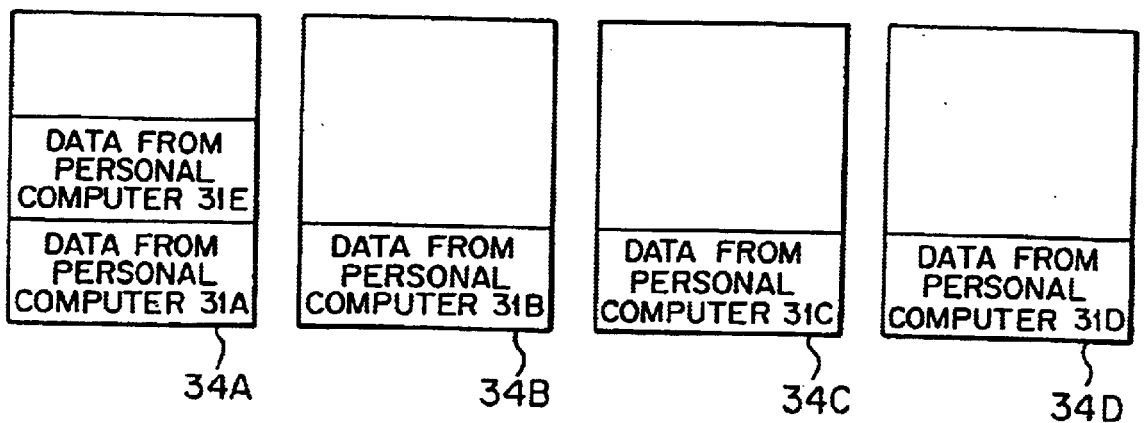

PRINTER HAVING A PLURALITY OF LOGICAL PRINTERS THEREIN AND HAVING A CONTROL UNIT WHICH CONTROLS THE LOGICAL PRINTERS SO AS TO PRINT A VIRTUAL PRINTING PROCESS OF ONE PAGE AT A TIME, THUS ACTUALLY PRINTING DATA FOR A SINGLE PAGE

BACKGROUND OF THE INVENTION

1) Field of the Invention

The present invention relates to a printer such as a remote printer that is connected to a network such as a LAN (local area network) and prints in response to a print request from a terminal via the network.

2) Description of the Related Art

Generally, as shown in FIG. 22, plural personal computers (five computers in FIG. 22) 31A to 31E acting as terminals are arranged in a network such as LAN (local area network). A print server 32 receives print requests from the personal computers 31A to 31E and operates a remote printer (hereinafter referred to as a printer) 33 to execute print requests from the personal computers 31A to 31E. Namely, a sole printer 33 is shared by the personal computers 31A to 31E, using the print server 32.

When being accepted by the print server 32, data regarding print requests from the personal computers 31A to 31E are spooled into the queue 34 to the printer 33 included in the print server 32. When the print requests are spooled into the queue 34, the personal computers 31A to 31E which have requested printing are released from the print server 32.

At this time, since the print server 32 hands the sole printer 33 data in job unit, the printer 33 in the network shown in FIG. 22 receives the next job's print request after the completion of a job's print request.

As shown in FIG. 23(a), where the print server 32 receives print requests from plural personal computers 31A, 31C, 31E, and 31B and then stores data regarding the print requests into the queue 34, the printer 33 performs a printing operation in accepting order of print requests, as shown in FIGS. 23(a), 23(b), and 23(c).

In such a printing method, for example, the personal computer 31A first issues ten print requests and then the personal computer 31C issues one print request. The printer 33 cannot print only one hard copy in response to the next request from the personal computer 31C before it has printed ten hard copies in response to a request from the personal computer 31A. If the printer 33 stops its printing operation due to any troubles relating to applications, all jobs in waiting state become a print waiting state.

For example, the network shown in FIG. 24 has been proposed. Referring to FIG. 24, the network includes plural printers 33A to 33D (four printers in Figures) and the print server 32 includes queues 34A to 34D connected respectively to printers 33A to 33D.

In the network, in order to set printers 33A to 33D to personal computers 31A to 31E, respectively, the personal computers 31A to 31E determines previously printers to be subjected to print requests or designate a specific printer to be requested when personal computers 31A to 31E issue print requests to the print server 32.

As shown in FIGS. 25(a) to 25(d), print request data from the personal computers 31A to 31E are spooled to the queues 34A to 34D to printers 33A to 33D set. Then the printers 33A to 33D perform printing without waiting the print end of the other personal computers 31A to 31E.

However, the network shown in FIG. 24 needs to arrange printers in number corresponding to the queues to the printers set in the print server 32, whereby the network construction cost is increased.

SUMMARY OF THE INVENTION

The present invention is made to overcome the above mentioned problems. An object of the present invention is to provide a printer that can effectively handle print requests from plural terminals without increasing running costs so that a single printer can functions as if plural printers operate.

In order to achieve the above object, according to the present invention, the printer is characterized by a print execution unit for printing on predetermined paper and a control unit for controlling the operation of the print execution unit, the control unit controlling the operation of the print execution unit in response to an external print request to perform a printing operation, the control unit including plural logical printers each which performs a virtual printing process corresponding to plural jobs; whereby the control unit controls the operation of the print execution unit when each of the logical printers has completed a virtual printing operation for one page, thus printing actually data for the page.

As described above, according to the present invention, the printer performs an actual printing for a page when each logical printer has completed a virtual printing process for the page, thus performing an actual printing process in the order of completed pages. Therefore, other jobs can be printed out without waiting for the completion of a printing process corresponding to one job. A user can use physically a single printer as if his personal printer is operated. There is an advantage in that print requests from plural terminals can be effectively processed without the increasing running cost.

BRIEF DESCRIPTION OF THE DRAWINGS

FIG. 25(a) is a diagram showing the status of print request data each stored in plural queues in the print server;

FIG. 25(b) is a diagram showing the status of print request data each stored in plural queues in the print server;

FIG. 25(c) is a diagram showing the status of print request data each stored in plural queues in the print server; and FIG. 25(d) is a diagram showing the status of print request; data each stored in plural queues in the print server.

DESCRIPTION OF THE PREFERRED EMBODIMENTS a) Aspect of the Invention

Figure 1:
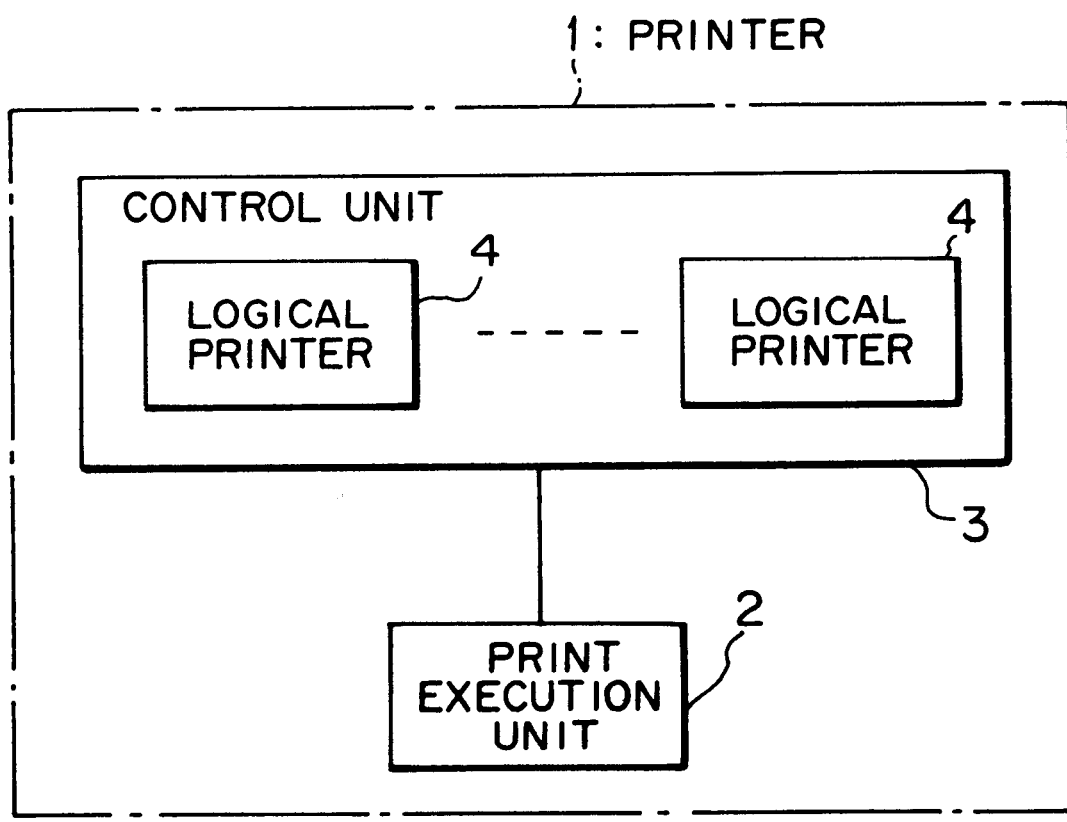
FIG. 1 is a block diagram showing an aspect of the present invention.

FIG. 1 is a block diagram showing an aspect of the present invention. Referring to FIG. 1, numeral 1 represents a printer according to the present invention. The printer 1 includes a print execution unit 2 that prints on predetermined paper and a control unit 3 that controls the operation of the print execution unit 3. The control unit 3 controls the operation of the print execution unit 2 in response to an external print request to perform a printing operation.

The printer 1 of the present invention includes plural logical printers 4 arranged in the control unit 3 to perform virtual printing operation corresponding to plural jobs. When each of the logical printers 4 has completed a virtual printing operation, the control unit 3 controls the operation of the print execution unit 2 so that data for one page is actually printed out.

Each logical printer 4 includes a logical hopper to feed paper at a virtual printing time and a logical stacker to receive ejected paper at a virtual printing time. When the control unit 3 and the print execution unit 2 perform an actual printing process, the logical hopper may correspond to an actual physical hopper and the logical stacker may correspond to an actual physical stacker.

A communication protocol and/or a printer emulation may be set to each logical printer 4.

An abnormal state occurs in the group of plural logical printers 4, only the fault logical printer 4 is ceased.

An external terminal connected via a network may set various setting conditions for printing process, the corresponding relationship between a logical hopper and an actual physical hopper, the corresponding relationship between a logical stacker and an actual physical stacker, the communication protocol, and the printer emulation.

In the printer 1 of the invention shown in FIG. 1, at the time each logical printer 4 has completed a virtual printing operation for one page or a page for the job, the print execution unit 2 performs an actual printing process for the corresponding page. Hence an actual printing operation is performed in the order of pages to which each logical printer 4 has completed a virtual printing operation. The print output for another job can be obtained without waiting for the completion of a printing process corresponding to one job.

Each logical printer 4 can include a logical hopper and a logical stacker to select the relationship between the logical hopper and the corresponding physical hopper and the relationship between the logical stacker and the corresponding physical stacker. Thus, since the existing printer driver can be used, it is unnecessary to change the setting of the printer 1 for each application.

Printing can be performed with a heterogeneous communication protocol and/or a heterogeneous printer emulation by making a print request to a logical printer 4 in which a desired communication protocol and/or a desired printer emulation is set.

When an abnormal state occurs in the logical printers 4, other logical printers continue their printing operations by stopping only the operation of the fault logical printer 4. Hence the print output is made in the job not related to the fault logical printer so that influence due to the abnormal occurrence can be minimized.

Various setting conditions for printing process, the relationship between a logical hopper and a physical hopper, the relationship between a logical stacker and a physical stacker, a communication protocol, and a printer emulation can be set through an external terminal connected via a network. Hence an operator can perform the setting operation without going to the spot where the printer 1 of the invention is installed.

As described above, according to the printer 1 of the invention, when each logical printer 4 has completed its virtual printing operation for one page, an actual printing is performed for the corresponding page. Since an actual printing process is performed in the order of completed pages, a print output for another job can be obtained without waiting the completion of the printing process corresponding to one job. Each of users can use a sole printer as if it is his private printer. Print requests from plural terminals can be effectively handled without an increased running cost.

The existing print driver can be used by selecting the relationship between a logical hopper and a physical hopper and the relationship between a logical stacker and the physical stacker. The print output of interest can be obtained without varying the setting of each application.

Communication protocol and printer emulation may be set for each logical printer. A user can perform a printing process with a heterogeneous communication protocol and/or a heterogeneous printer emulation without recognizing other jobs by requesting a logical printer in which a desired communication protocol and/or a desired printer emulation are set. As a result, the printing operation can be performed with high flexibility. A single printer can deal effectively with various processes.

Where the operation of only the fault logical printer is stopped at an abnormal occurrence time, other logical printers continue the printing operation. Hence the job not related to the fault logical printer can be printed out with the minimum waiting time for the printing operation so that the influence due to the abnormal occurrence can be suppressed to a minimum.

An external terminal can be used to set remotely the various setting conditions, the relationship between a logical hopper and a physical hopper, and the relationship between a logical stacker and a physical stacker, a communication protocol, and a printer emulation. Hence, an operator can perform various setting operations without going to the place where the printer is installed. Particularly, the present invention is effective in the system configuration where the printer 1 is located remotely from terminals.

(b) Embodiment

The embodiment according to the present invention will be described below with reference to attached drawings.

Figure 2:
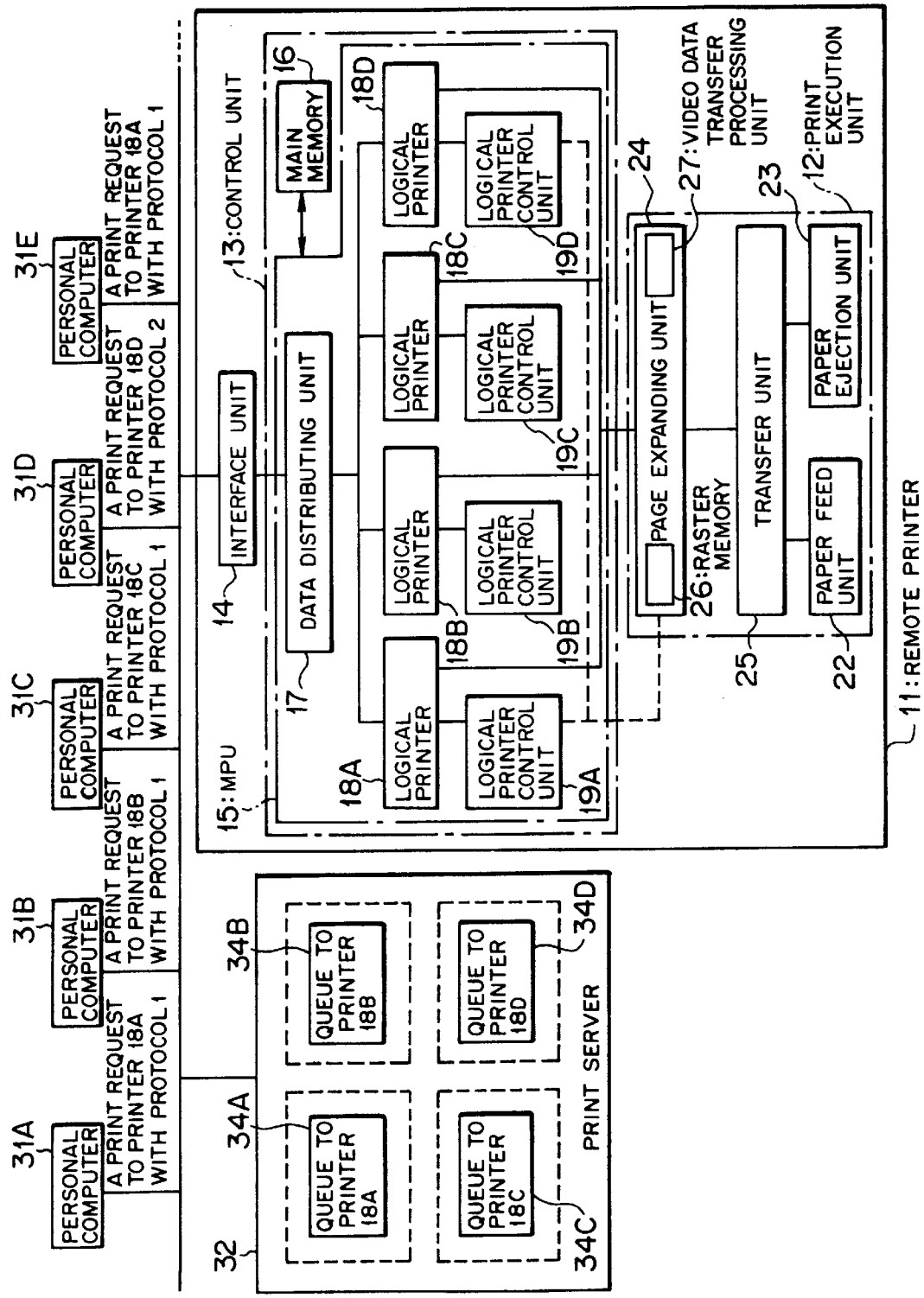
FIG. 2 is a block diagram showing the configuration of a printer and the LAN configuration associated with the printer according to the first embodiment of the present embodiment.
Figures 3A, 3B, 3C, 3D:
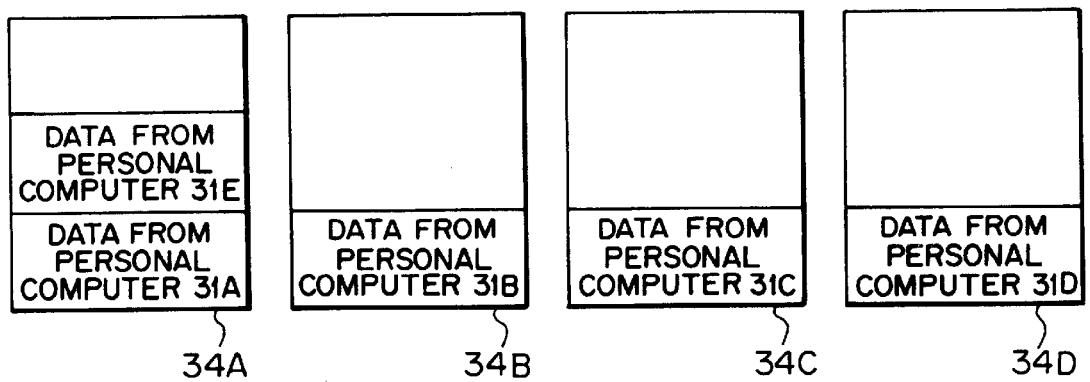
FIG. 3(a) is a diagram showing the status of print request data stored each of plural queues in the print server according to the present embodiment.
FIG. 3(b) is a diagram showing the status of print request data stored each of plural queues in the print server according to the present embodiment.
FIG. 3(c) is a diagram showing the status of print request data stored each of plural queues in the print server according to the present embodiment.
FIG. 3(d) is a diagram showing the status of print request data stored each of plural queues in the print server according to the present embodiment.
Figure 22:
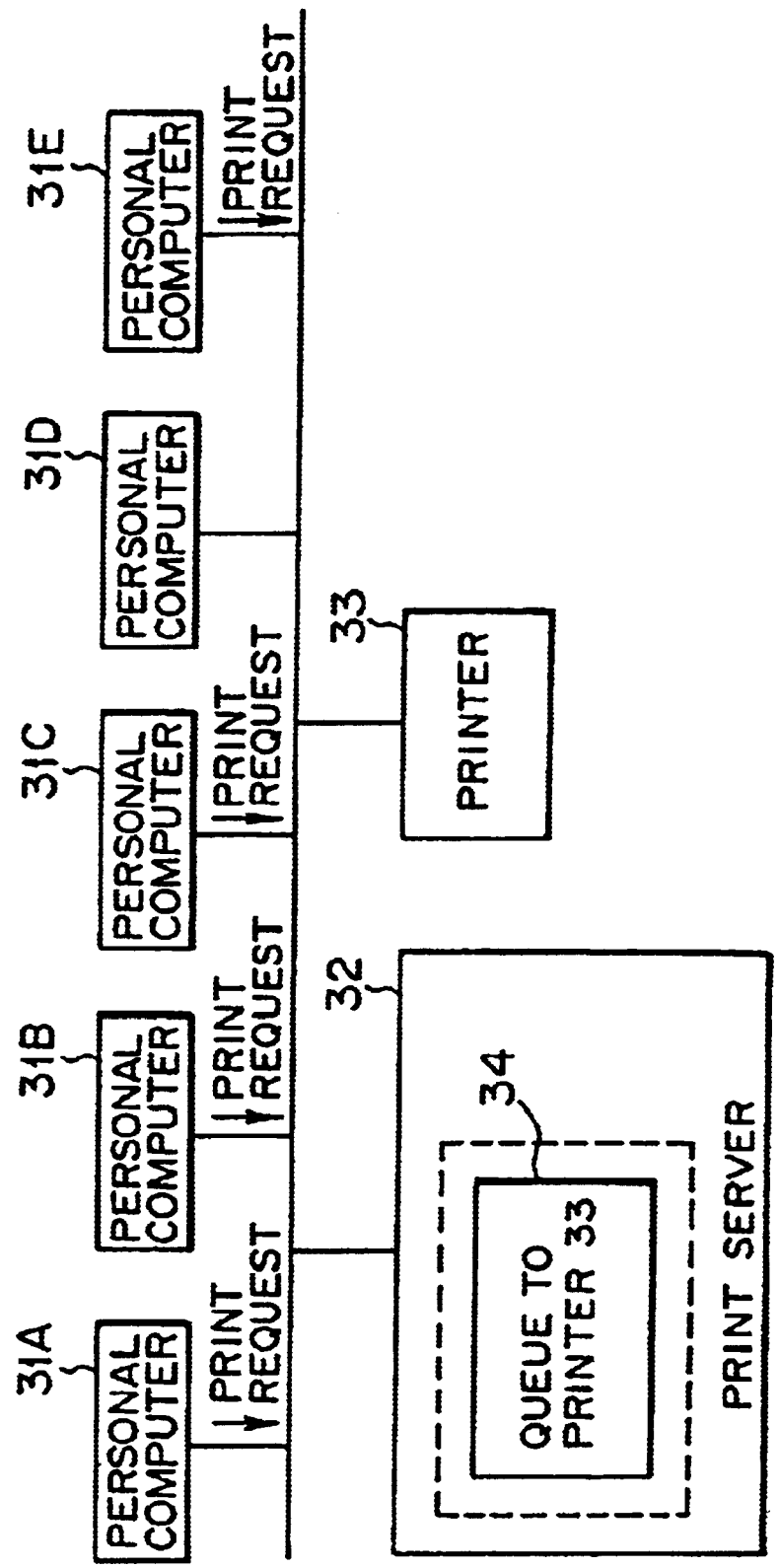
FIG. 22 is a block diagram showing the configuration example of a LAN including a remote printer.
Figure 23A:
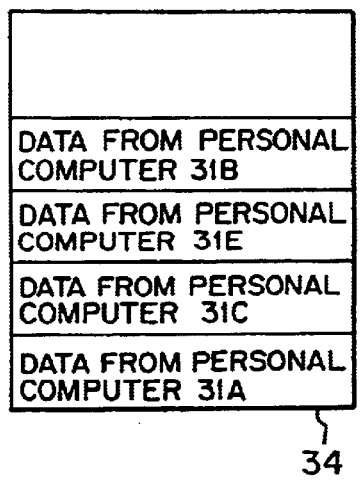
FIG. 23(a) is a diagram showing the status of print request data stored in a queue in a print server.
Figure 23B:
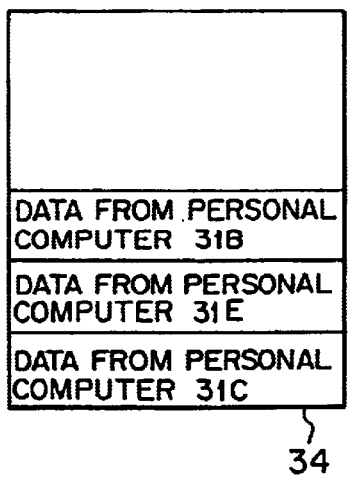
FIG. 23(b) is a diagram showing the status of print request data stored in a queue in a print server.
Figure 23C:
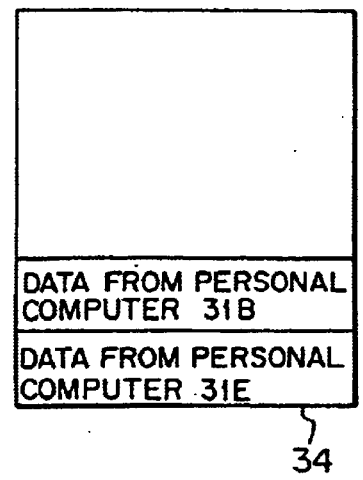
FIG. 23(c) is a diagram showing the status of print request data stored in a queue in a print server.

FIG. 2 is a block diagram showing the configuration of the printer according to the embodiment of the present invention and the LAN configuration to which the printer is connected. As shown in FIG. 2, like the configuration shown in FIG. 22, the remote printer (hereinafter referred to as a printer) 11 according to the embodiment is connected to plural (five in FIG. 2) personal computers 31A to 31E and print server 32 via a network such as LAN.

Figure 24:
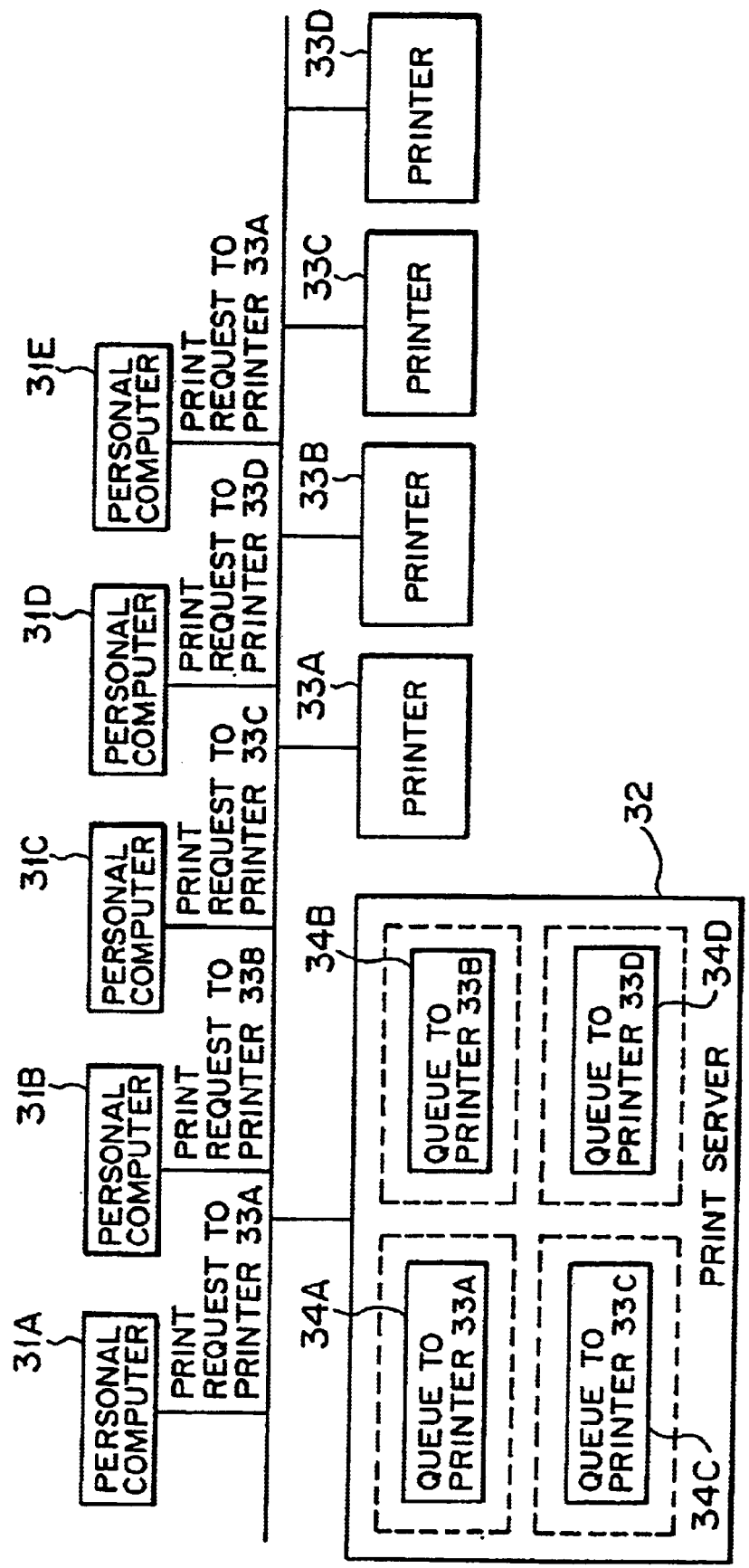
FIG. 24 is a block diagram showing the configuration example of a LAN including plural remote printers.

Like the configuration shown in FIG. 24, four queues 34A to 34D are arranged in the print server 32 to store data regarding print requests respectively to four logical printers 18A to 18D (to be described later) in the printer 11. As shown in FIGS. 3(a) to 3(d), the print request data from the personal computers 31A to 31E are spooled into any one of the queues 34A to 34D.

According to the present embodiment, the printer 11, as shown in FIG. 2, includes a print execution unit 12 that prints on predetermined paper, a control unit (logical printer processing unit) 13 that controls the operation of the print execution unit 12, and an interface unit (LAN board) 14 that receives a print request from the external personal computers 31A to 31E via the LAN. In response to print requests from the external personal computers 31A to 31E, the control unit 13 controls the operation of the print execution unit 12 to perform a printing operation.

Figure 14:
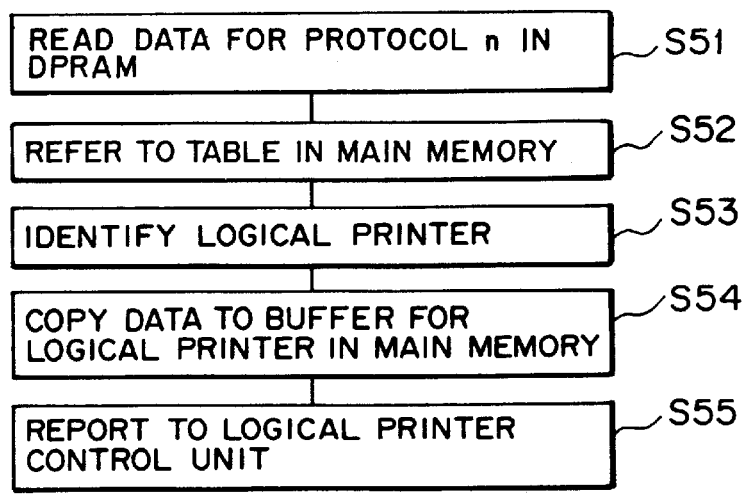
FIG. 14 is a flowchart used for explaining the operation of the data distributing unit (logical printer identifying unit) in the printer according to the present embodiment.
Figure 15:
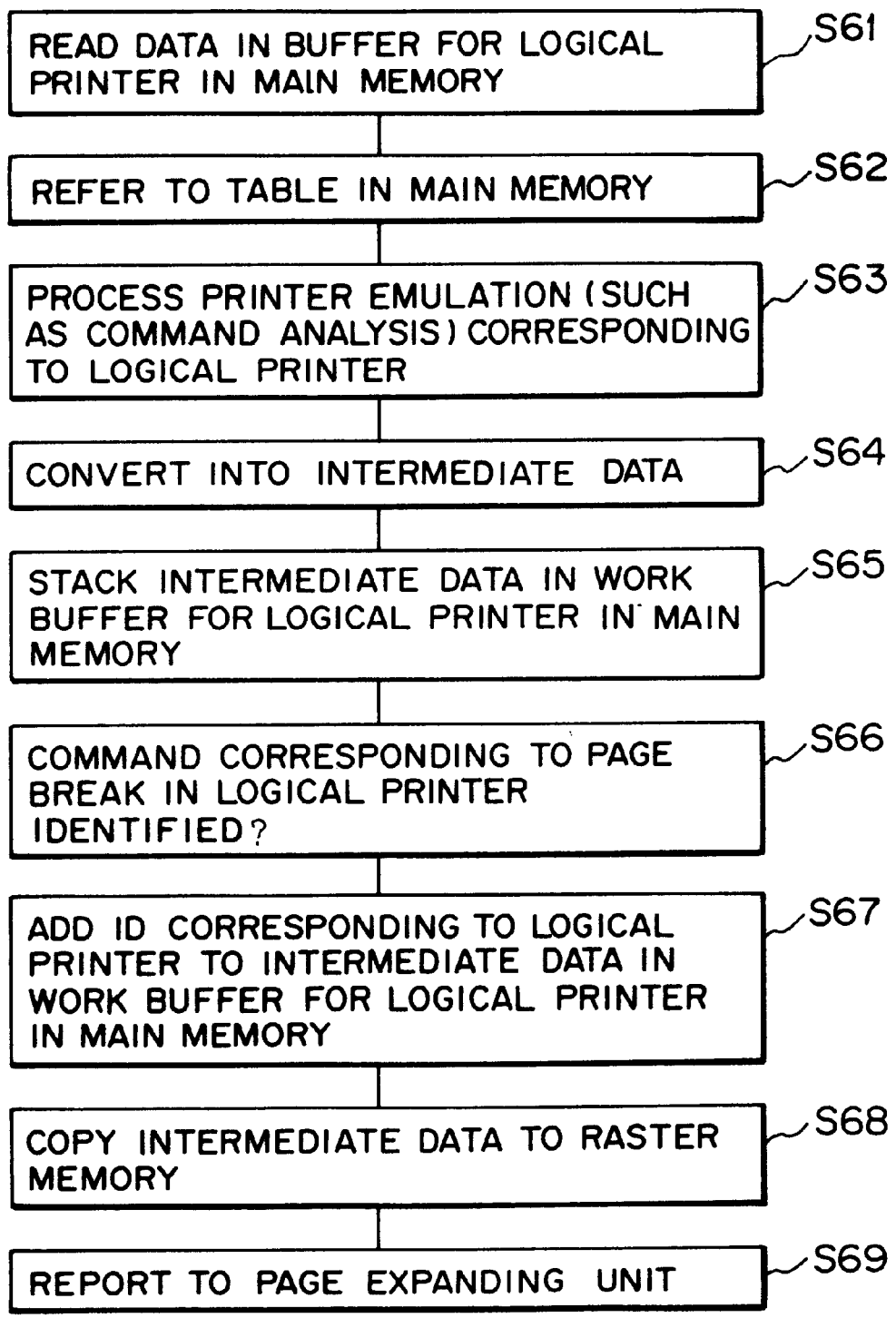
FIG. 15 is a flowchart used for explaining the operation of the logical printer control unit and the logical printer in the printer according to the present embodiment.
Figure 16:
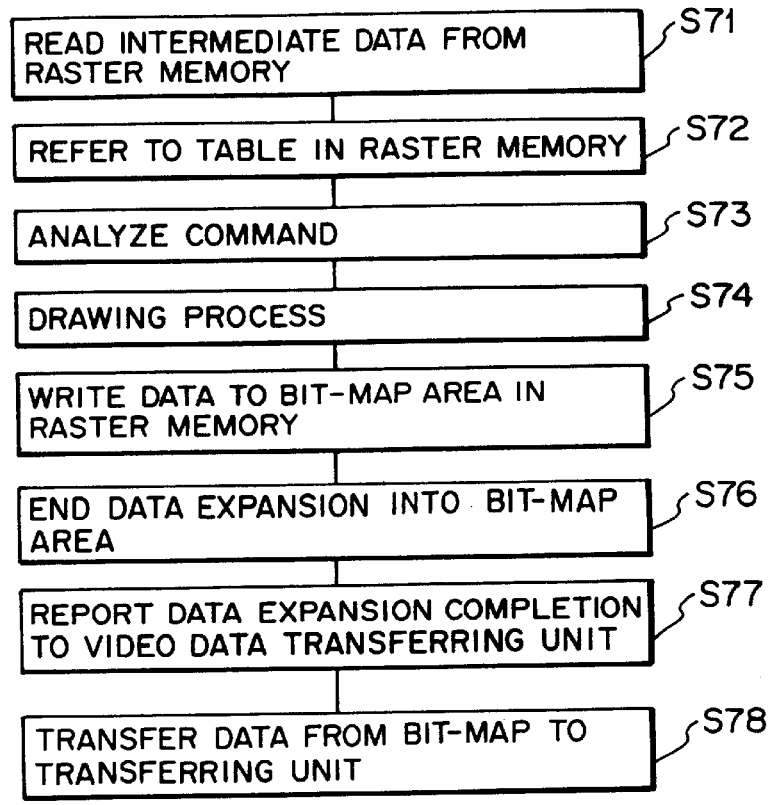
FIG. 16 is a flowchart used for explaining the operation of the page expanding unit in the printer according to the present embodiment.

According to the present embodiment, the control unit 13 in the printer 11 consists of a MPU 15 and a main memory 16. The MPU 15 operates based on data stored in the main memory 16. In the present embodiment, the MPU 15 acts as the data distributing unit (logical printer identification unit) 17, four logical printers 18A to 18D, and logical printer control units 19A to 19D. The main memory 16, for example, as shown in FIG. 14, has areas such as a program area and a reference table, data buffer areas for the logical printers 18A to 18D, and intermediate data buffer areas for the logical printers 18A to 18D.

The data distributing unit 17 distributes external print request data received by the interface unit 14 to one of four logical printers 18A to 18D to operate virtually the job corresponding to the print request.

Figure 20:
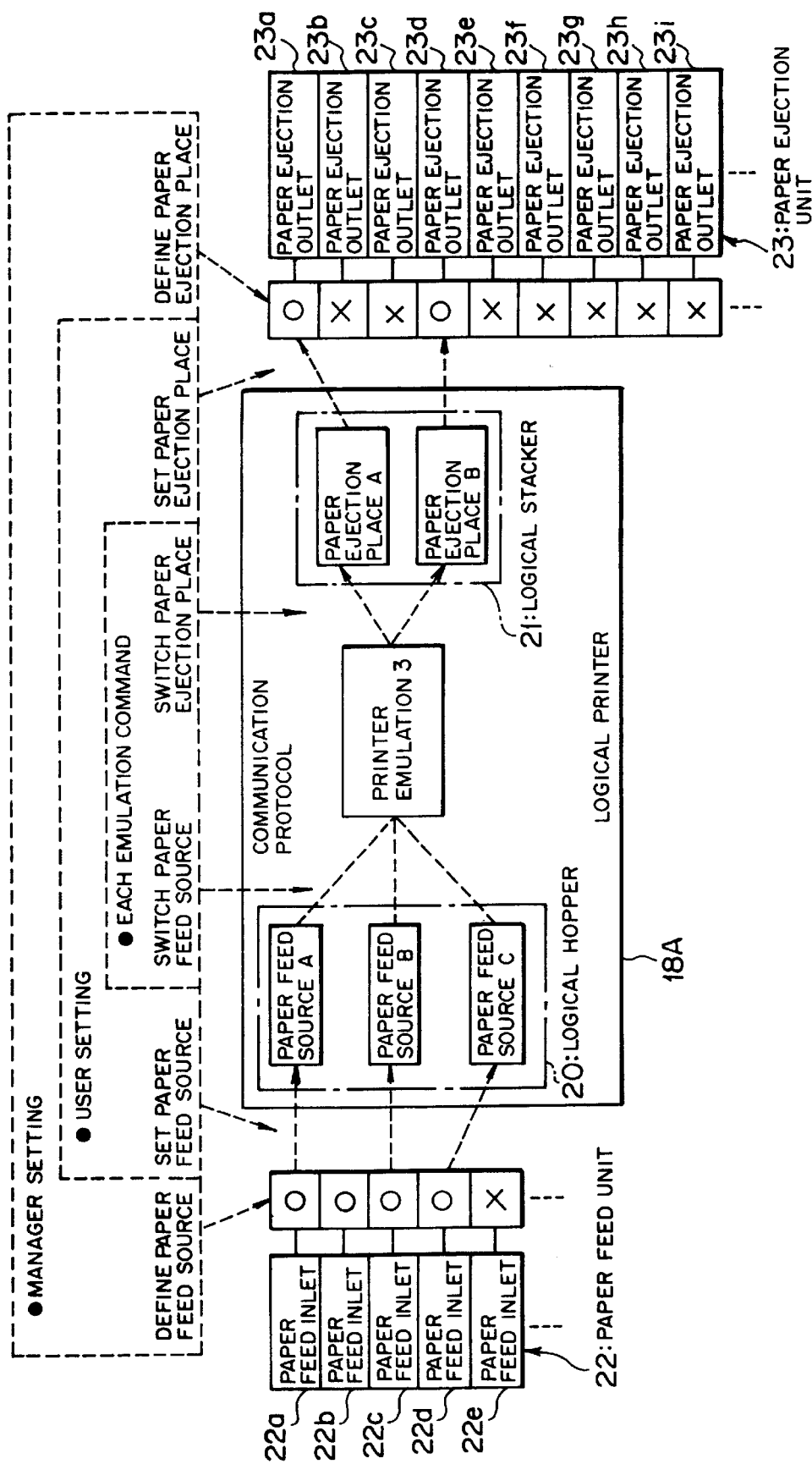
FIG. 20 is a block diagram used for explaining various setting conditions in the printer according to the present embodiment.
Figure 21:
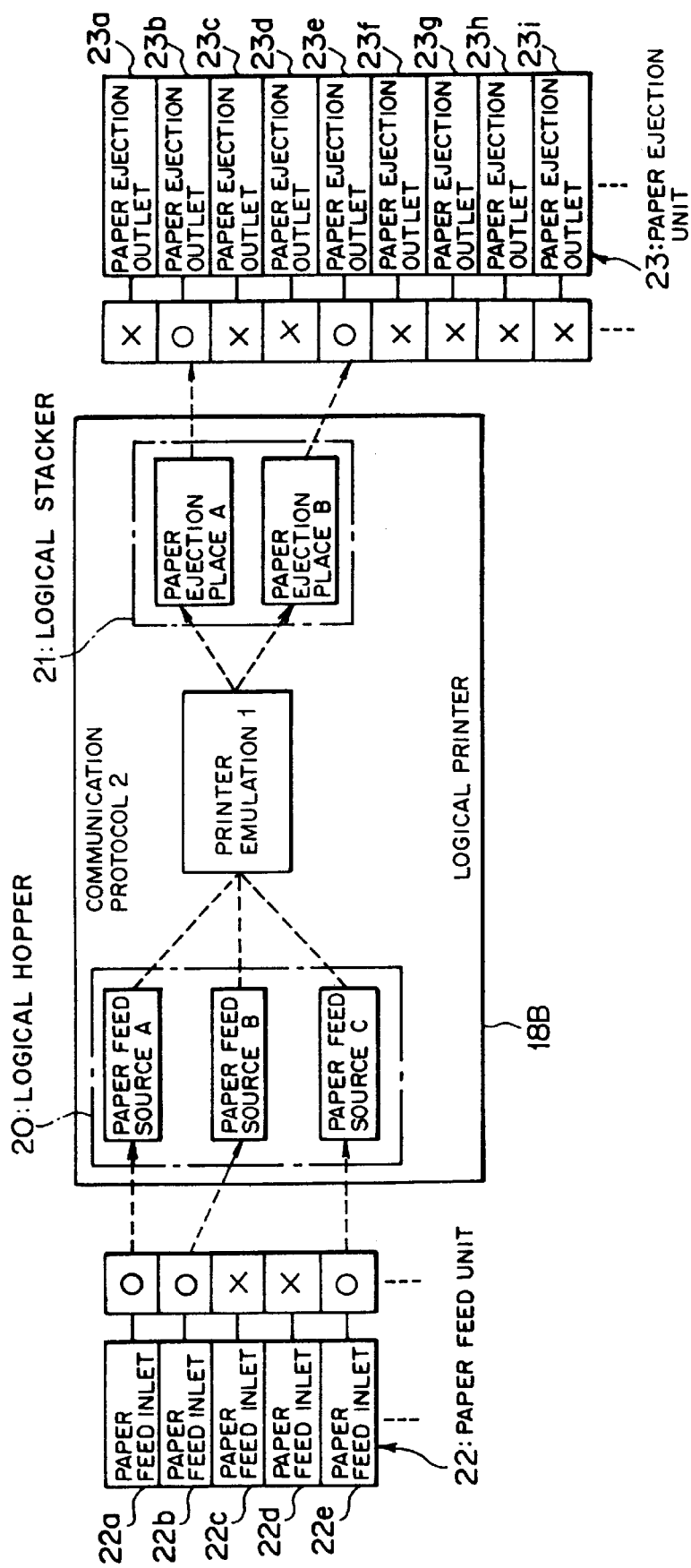
FIG. 21 a block diagram used for explaining various setting conditions in the printer according to the present embodiment.

The logical printers 18A to 18D are respectively controlled by the logical printer control units 19A to 19D to perform virtual printing processes corresponding to plural jobs. As shown in FIGS. 18 to 21, each of the logical printers 18A to 18D includes a logical hopper 20 that feeds paper in a virtual printing process and a logical stacker 21 that receives ejected paper in a virtual printing process. When the print execution unit 12 executes an actual printing operation, the logical hopper 20 is related to an actual paper feeding unit (physical hopper) 22 while the logical stacker 21 is related to an actual paper ejection unit (physical stacker) 23. In the printer 11 according to the present embodiment, as shown in FIGS. 20 and 21, the paper feeding unit 22 has plural paper feeding inlets 22a to 22e while the paper ejection unit 23 has plural (nine in figure) paper ejection outlets 23a to 23i.

The logical printer control units 19A to 19D control virtual printing processes of the logical printers 18A to 18D, respectively. When each of the logical printers 18A to 18D has completed its virtual printing process for one page, the logical printer control units 19A to 19D control the operation of the print execution unit 12 to actually print out data for the page.

In the present embodiment, as described with FIGS. 18 to 21, a communication protocol or printer emulation is set to each of the logical printers 18A to 18D. If an abnormal state (e.g. out of paper, a stackerfull of paper, or communication error) occurs in the logical printers 18A to 18D, the logical printer control units 19A to 19D control so as to stop only the operation of the fault logical printer. Moreover, according to the present embodiment, various setting conditions for a printing process, the relationship between the logical hopper 20 and the paper feed unit 22, the relationship between the logical stacker 21 and the paper ejection unit 23, the communication protocol, and the printer emulation can be set through personal computers 31A to 31E externally connected via the LAN.

The print execution unit 12 arranged in the printer 11 of the present embodiment is constituted of a page expanding unit 24, a transfer unit 25, a paper feed unit 22, and a paper ejection unit 23.

The page expanding unit 24 includes a raster memory 26, and a video data transfer processing unit 27. When each logical printer 18A to 18D has completed its virtual printing operation for one page, the page expanding unit 24 expands data for the page in the raster memory 26, in response to a designation from each of the logical printer control units 19A to 19D.

Figure 5:
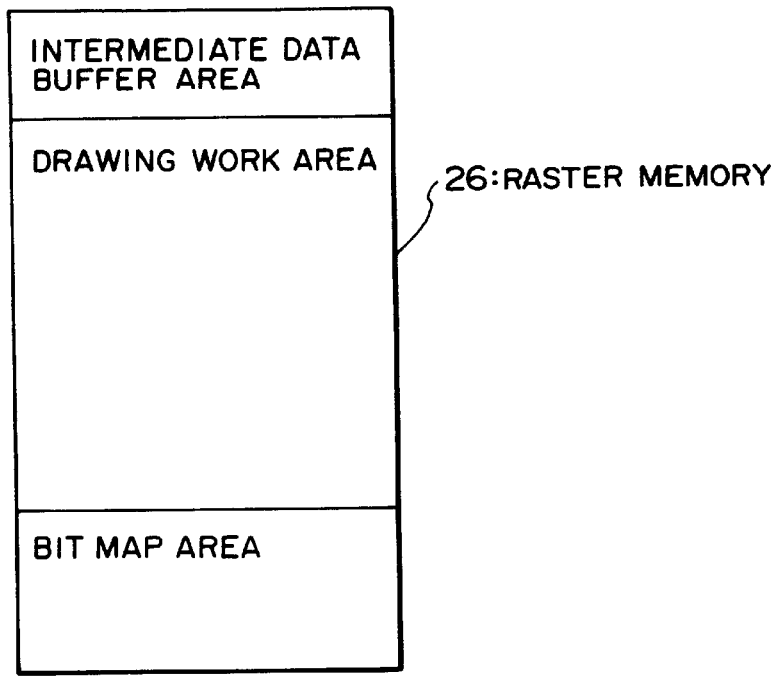
FIG. 5 is a diagram showing the configuration of the raster memory used in the printer according to the present embodiment.

The raster memory 26, for example, as shown in FIG. 5, includes an intermediate data buffer area, a drawing work area, and a bit-map area. The video data transfer processing unit 27 transfers data (video data) expanded in the bit-map area formed in the raster memory 26 to the transfer unit 25.

The transfer unit 25 receives the designated paper from the paper feeding unit (paper feeding inlets 22a to 22e) 22, and then transfers data from the page expanding unit 24 onto the paper, and then ejects the transferred paper to the designated paper ejection unit (paper ejection outlets 23a to 23i) 23.

Figure 6:
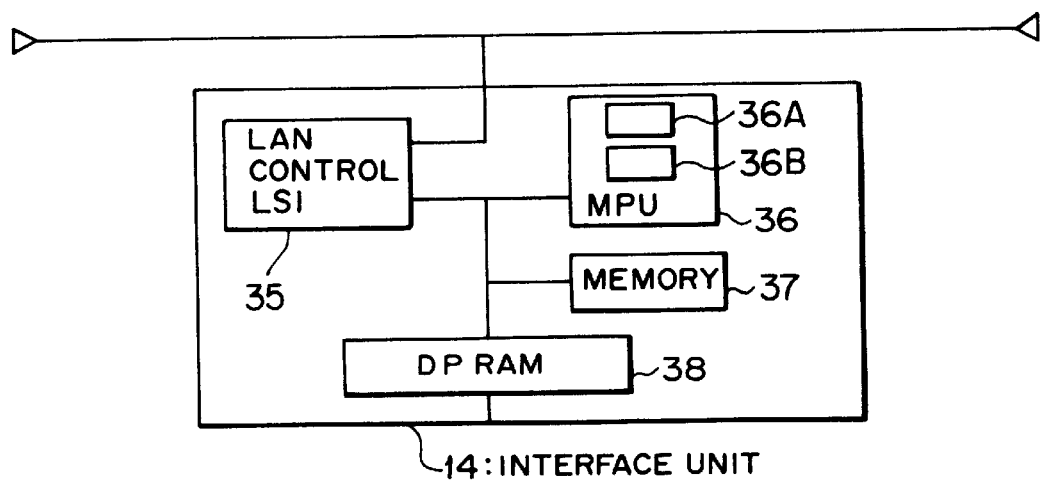
FIG. 6 is a block diagram showing the configuration of the interface unit (LAN board) used in the printer according to the present embodiment.

According to the present embodiment, the interface unit (LAN board) 14, as shown in FIG. 6, consists of a LAN control LSI 35, a MPU 36, a memory 37, and a DPRAM (dual port RAM) 38.

If the data received from the LAN is for the purpose of the self printer 11, the LAN control LSI 35 captures it into the memory 38 and interrupts to the MPU 36.

The MPU 36 operates based on data stored in the memory 37 and acts as a protocol identifying unit 36A and a protocol processing unit 36B in this embodiment. The protocol identifying unit 36A identifies the communication protocol of data received and the protocol processing unit 36B executes a protocol process according to the communication protocol identified by the protocol identifying unit 36A.

Figure 7:
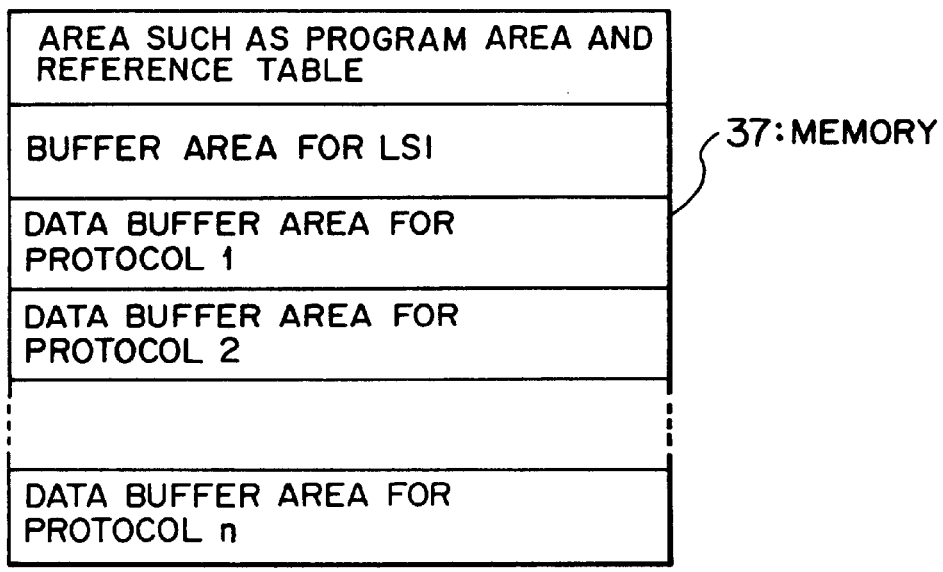
FIG. 7 is a diagram showing the configuration of the memory in the interface unit according to the present embodiment.
Figure 8:
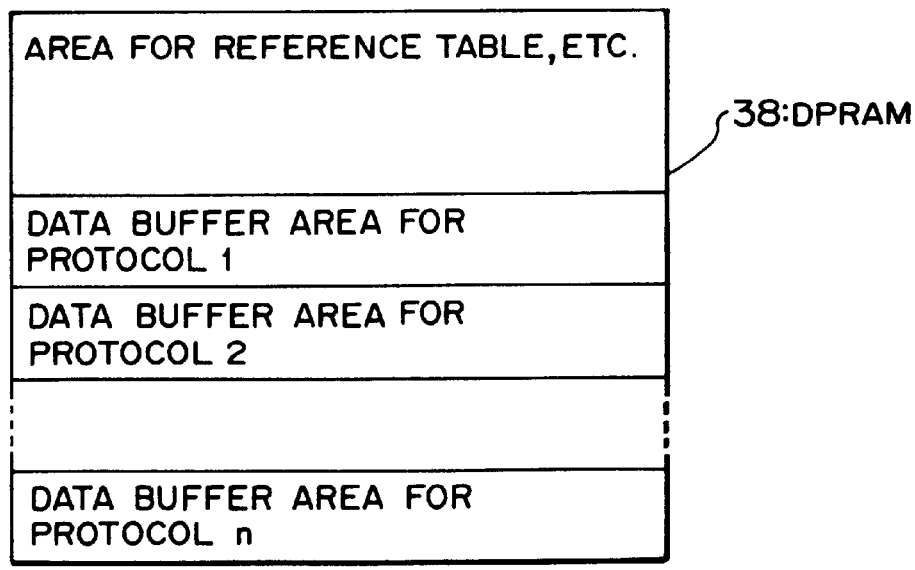
FIG. 8 is a diagram showing the configuration of the DPRAM in the interface unit according to the present embodiment.

The memory 37, as shown in FIG. 7, includes areas such as a program area and a reference table, a buffer area for the LAN control LSI 35, and data buffer areas for protocols 1 to n. The DPRAM 38 which outputs to the control unit (data distribution unit 17) 13 has an area such as a reference table and a data buffer area for protocols 1 to n, as shown in FIG. 8.

Figures 9, 10:
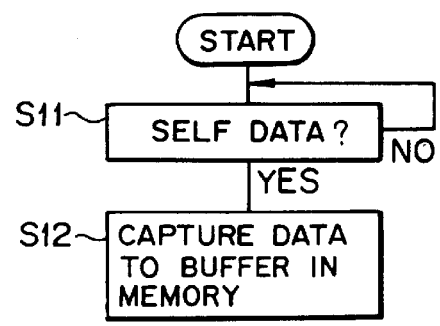
FIG. 9 is a diagram showing the configuration of the transfer data according to the present embodiment.
FIG. 10 is a flowchart used for explaining the operation of the LAN control LSI used in the interface according to the present embodiment.

In the present embodiment, data which is transferred from each of the personal computers 31A to 31E via the print server 32, as shown in FIG. 9, is formed of a header, an address to be transferred, a transfer source address, a data portion, a protocol identification code designating a communication protocol, and a logical printer identification code designating the logical printers 18A to 18D.

The operation of the printer 11 will be explained below with reference to the flowchart shown in FIGS. 10 to 17.

The operation of the interface unit 14 will be explained by referring to FIGS. 10 to 12.

The LAN control LSI 35, as shown in FIG. 10, decides whether data from the LAN is always received for the printer 11 (step S11). If the data is for the printer 11, the LAN control LSI 35 reads it into the LSI buffer area in the memory 37 (step S12) to subject the MPU 36 to an interrupt operation.

Figure 11:
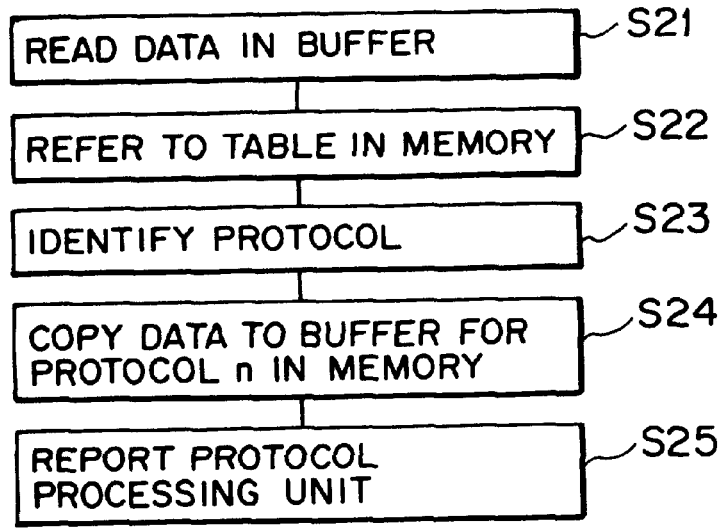
FIG. 11 is a flowchart used for explaining the operation of the protocol identifying unit in the interface unit according to the present embodiment.
Figure 12:
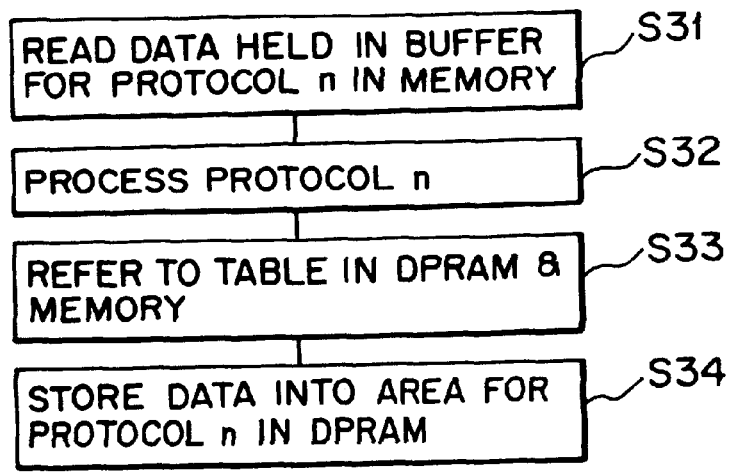
FIG. 12 is a flowchart used for explaining the operation of the protocol processing unit in the interface unit according to the present embodiment.

In the MPU 36, the protocol identifying unit 36A, as shown in FIG. 11, reads out data written into the LSI buffer area of the memory 37 (step S21), checks the protocol identification code (refer to FIG. 9) of the data against the table in the memory 37 (step S22), and then identifies the communication protocol of the data (step S23). The MPU 36 copies data to the data buffer area for protocol according to the identification result (step S24) and then informs the protocol processing unit 36B that the data has been copied (step S25).

The protocol processing unit 36B which has received the report reads out data in the data buffer area for protocol stored in the memory 37 which has been subjected to a data copying (step S31), performs a process according to the corresponding communication protocol (step S32), and then refers to the tables stored in the DPRAM 38 and the memory 37 (step S33). Then the protocol processing unit 36B stores data after the protocol processing operation into the data buffer area for the corresponding protocol in the DPRAM 38 (step S34) and then subjects the MPU 15 in the control unit 13 to an interrupting process.

Figure 13:
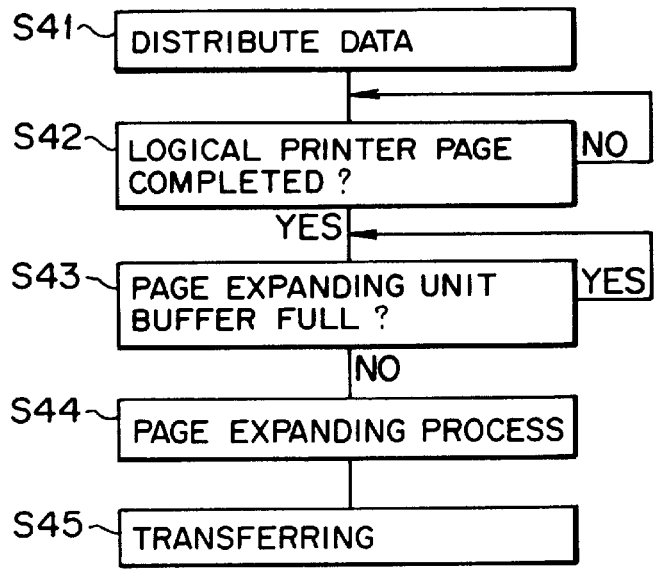
FIG. 13 is a flowchart used for explaining schematically the operational flow of the printer according to the present embodiment.

The control unit 13 and the print execution unit 12 perform the process schematically shown in FIG. 13. In other words, the data distributing unit 17 distributes the data received by the interface unit 14 which is subjected to a protocol process to a specified one of the logical printers 18A to 18D (step S41). The logical printer control units 19A to 19D control the logical printers 18A to 18D while the logical printers 18A to 18D subject data distributed in the logical printers 18A to 18D to a virtual printing process.

The logical printer control units 19A to 19D monitor whether each of the logical printers 18A to 18D has completed a printing process for one page (step S42) and decides whether the buffer in the page expanding unit 24 is in a full state when a printing operation for one page has been completed (step S43). If not in a full state, the page expanding unit 24 receives data for one page which has been completed by each of the logical printers 18A to 18D and then performs a page expanding process (step S44). Then the transfer unit 25 performs an actual printing operation to predetermined paper (step S45).

With reference to FIGS. 14 to 17, explanation will be made below in detail as to the operations of the data distributing unit 17, the logical printers 18A to 18D, the logical printer control units 19A to 19D, the page expanding unit 24, and the transfer unit 25.

Figure 4:
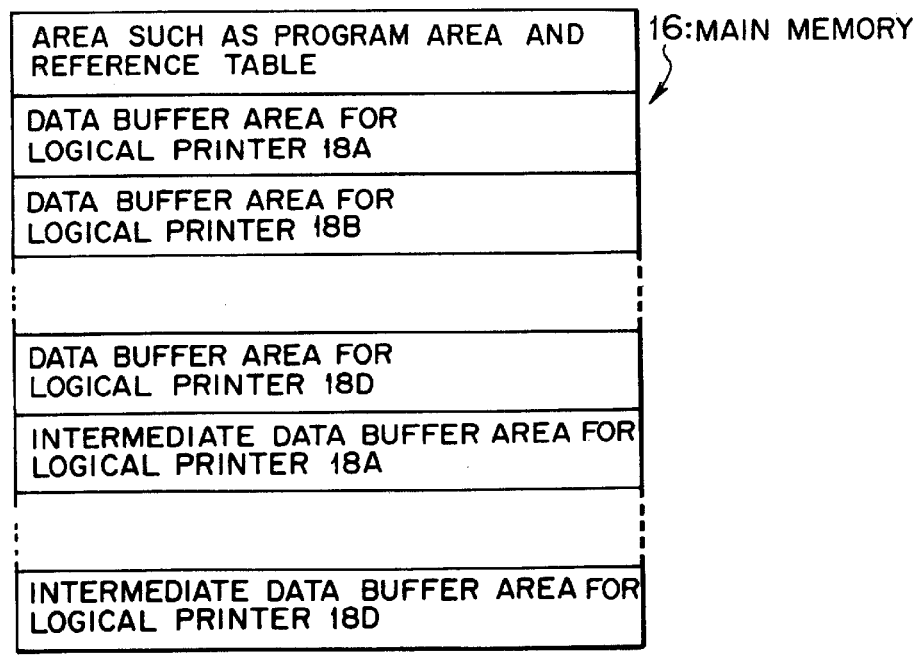
FIG. 4 is a diagram showing the configuration of the main memory used in the printer according to the present embodiment.

The data distributing unit 17, as shown in FIG. 14, reads data regarding predetermined communication protocol out of the DPRAM 38 in the interface unit 14 (step S51) to refer to the table stored in the main memory 16 (step S52), thus identifying a designated logical printer by which the data printing process is performed (step S53). The data is copied into the data buffer area (refer to FIG. 4) for the designated logical printer in the memory 16 (step S54). Then the data distributing unit 17 informs a specific one of the logical printers 18A to 18D and a specific one of logical printer control units 19A to 19D that data to be printed has come (step S55).

When the logical printers 18A to 18D and the logical printer control units 19A to 19D receive a report from the data distributing unit 17, they read data of data buffer area for the self logical printer out of the main memory 16 (step S61) and then refer to the table stored in the main memory 16 (step S62), and thus performs a printer emulation process (command analysis, etc.) or the like corresponding to the self logical printer (step S63).

The data read out is converted into intermediate data (step S64). The intermediate data is stacked in the intermediate data buffer area for the self logical printer in the main memory 16 (step S65). Thereafter, when the command corresponding to the page break of the self logical printer is recognized, or data for one page has been subjected to a virtual printing process (step S66), an ID corresponding to the self logical printer is added to the intermediate data stacked in the intermediate data buffer area for the self logical printer in the main memory 16 (step 867). The intermediate data is copied in the intermediate data buffer area of the raster memory 26 (refer to FIG. 5) (step S68). Then the fact that the intermediate data has been copied is informed the data expanding unit 24 (step S69).

When the data expanding unit 24 receives a report from the logical printer control units 19A to 19D, it reads the intermediate data for one page out of the intermediate buffer area in the raster memory 26 (step S71), and refers to the table of the raster memory 26 (step S72) to perform a command analysis (step S73). The data for one page is subjected to a drawing process, using the drawing work area in the raster memory 26 (step S74).

After the completion of the drawing process, the result of the drawing process is written into the bit-map area of the raster memory 26 (step S75). When expanding the data to the bit-map area has been completed (step S76), the completion of the data expanding process is informed the video data transferring unit 27 (step S77). The data expanded by the video data transferring unit 27 is transferred from the bit-map area to the transfer unit 25 (step S78).

Figure 17:
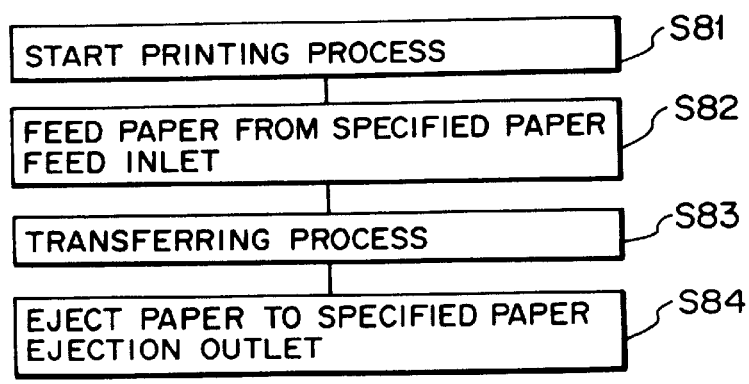
FIG. 17 is a flowchart used for explaining the operation of the transferring unit in the printer according to the present embodiment.

When the expanded data is transferred from the page expanding unit 24, the transfer unit 25 starts a printing process, as shown in FIG. 17 (step S81). After the paper fed from the paper feeding inlets 22a to 22e in a specified paper feeding unit 22 (step S82) is subjected to a transfer process (step S83), the transferred paper is ejected into the paper ejection outlets 23a to 23i of the specified paper ejection unit 23 (step S84).

The concept of the logical printers 18A to 18D will be explained in more concrete by referring to FIGS. 18 and 19. Where being viewed from the side of the personal computers 31A to 31D, the printer 11 appears as if it requests the printer with the configuration as shown in FIGS. 18 and 19 to perform it printing operation.

Figure 18:
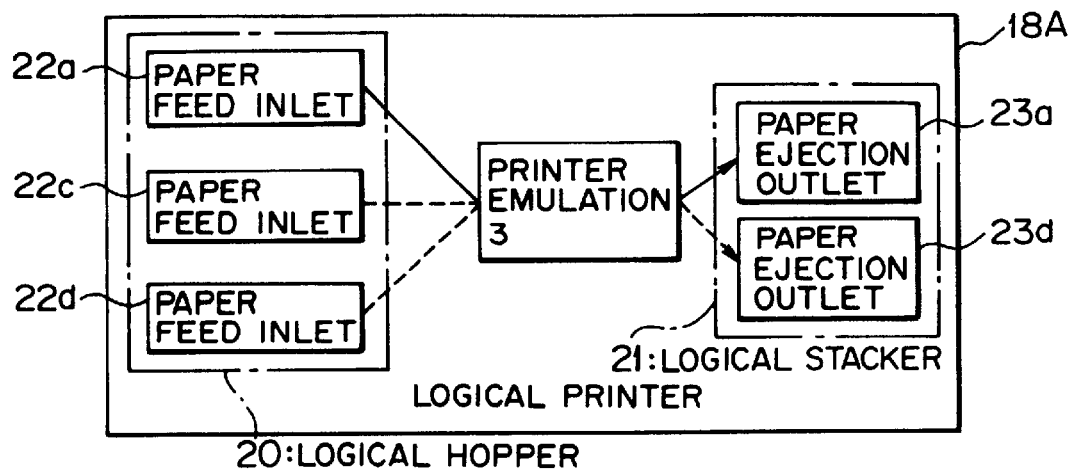
FIG. 18 is a block diagram used for explaining the concept of the logical printer according to the present embodiment.

In other words, in the embodiment shown in FIG. 18, the logical printer 18A executes a communication process using a communication protocol 1. The logical printer 18A which includes the paper feeding inlets 22a, 22c, and 22d acting as the logical hopper 20, and the paper ejection outlets 23a and 23d acting as the logical stacker 21 operates according to the printer emulation 3.

Figure 19:
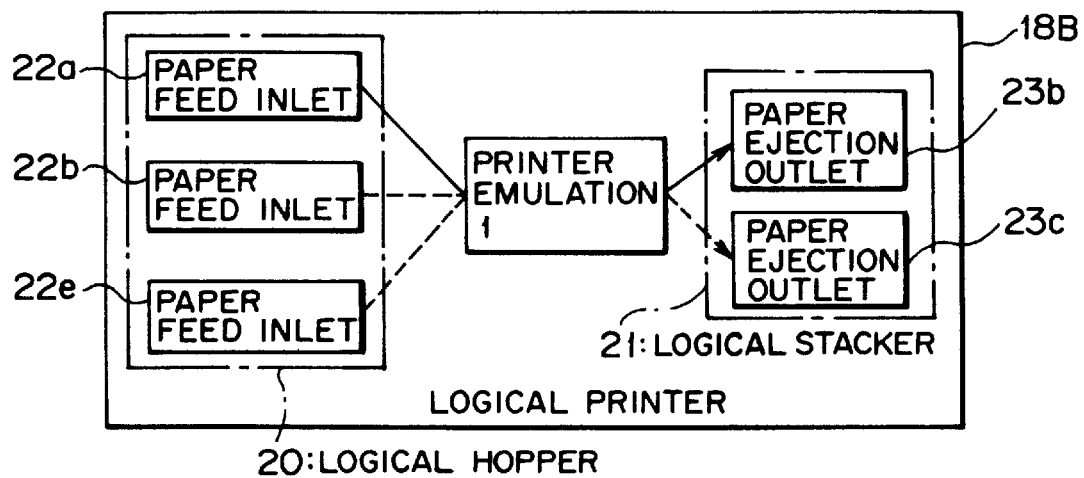
FIG. 19 is a block diagram used for explaining the concept of the logical printer according to the present embodiment.

In the embodiment shown in FIG. 19, the logical printer 18B performs a communication process with the communication protocol 2. The logical printer 18B which includes paper feeding inlets 22a, 22b, and 22e acting as the logical hopper 20 and paper ejection outlets 23b and 23e acting as the logical stacker 21 operates according to the printer emulation 1.

When receiving a print request from the personal computers 31A to 31D, the logical printers 18A and 18B subject the paper in the paper feeding inlet designated by the emulation command to a printing process and ejects the paper into the paper ejection outlet designated by the emulation command.

Furthermore, various conditions set to the printer 11 according to the present embodiment will be described below by referring to FIGS. 20 and 21.

The type of the logical printer 18A is set by the network manager. The setting contents include a communication protocol, a printer emulation, allocation of the paper feeding inlet (the logical hopper 20) that can be selected by a user among the physical paper feeding inlets 22a to 22e, and allocation of the paper ejection outlet (the logical stacker 21) that can be selected by a user among the physical paper ejection outlets 23a to 23i.

FIG. 20 shows, for example, the setting operation in the logical printer 18A. In the logical printer 18A, the communication protocol 1 and the printer emulation 3 are set while the physical paper feeding inlets 22a, 22c, and 22d are allocated as the paper feeding sources A, B, and C in the logical hopper 20, respectively, and the physical paper ejection outlets 23a and 23d are allocated as the paper ejection destinations A and B in the logical stacker 21, respectively.

FIG. 21 shows, for example, the step of setting the logical printer 18B. In the logical printer 18B, the communication protocol 2 and the printer emulation 1 are set while the physical paper feeding inlets 22a, 22b, and 22e are allocated as the paper feeding sources A, B, and C in the logical hopper 20, respectively, and the physical paper ejection outlets 23b and 23e are allocated as the paper ejection places A and B in the logical stacker 21.

In the logical printer 18A shown in FIG. 20, in order to perform actually a virtual printing process, the emulation command switches and selects a paper feeding source in the logical hopper 20 and a paper ejection destination in the logical stacker 21. In the logical printer 18B shown in FIG. 21, in order to perform actually a virtual printing process, the emulation command switches and selects a paper feeding source in the logical hopper 20 and a paper ejection destination in the logical stacker 21.

As described above, according to the embodiment of the present invention, when one of the logical printers 18A to 18D has completed a virtual printing process for one page, an actual printing process is performed for the corresponding page in the order of the completed pages. Thus the print out of another job can be obtained without waiting for the completion of a printing process corresponding to one job. A user can use the sole printer 11 as if the printer 11 is his personal printer. As a result, print requests from the plural personal computers 31A to 31D can be effectively processed without increasing the operating cost.

The existing printer driver can be used by selecting the relationship between the logical hopper 20 and the physical paper feeding inlets 22a to 22e and the relationship between the logical stacker 21 and the paper ejection outlets 23a to 23i. Hence the print output of interest can be obtained without varying the setting for each application.

The communication protocol and/or the printer emulation are set to each of the logical printers 18A to 18D. Where a print request is performed to the logical printers 18A to 18D in which a desired communication protocol and/or a desired printer emulation are used without recognizing other jobs, a printing operation is performed using a heterogeneous communication protocol and/or a heterogeneous printer emulation. Thus a very high flexibility is obtained in the printing process and the single printer 11 can deal flexibly with various processes.

When an abnormal state (such as out of paper, a stackfull of paper, or a communication error) occurs in any one of the logical printers 18A to 18D, the logical printer control units 19A to 19D stops only the operation of the fault printer among the logical printers 18A to 18D. Since the other logical printers continue the printing operation, the print regarding jobs not related to the fault logical printer is output with the minimum waiting time. Hence the influence due to the abnormal occurrence can be suppressed to the minimum degree.

The personal computers 31A to 31E can set remotely via the LAN various setting conditions, the relationship between a logical hopper and a physical hopper, the relationship between a logical stacker and a physical stacker, a communication protocol, and a printer emulation. Hence, an operator performs various settings without going to the spot where the printer 11 is installed. Particularly, in the case of the system configuration in which the printer 11 is installed remotely from personal computers 31A to 31E, the present invention is very effective.

The printer 11 including four logical printers has been explained in the above embodiment. However, the present invention should not be limited only to the above embodiment. The number of each of paper feeding units acting as physical hoppers, the paper ejection units acting as physical stackers, the logical hoppers, and the logical stackers should not be limited to the number exemplified in the above embodiment (e.g. shown in FIGS. 20 and 21).

In the above embodiment, the print server 32 receives print requests from the personal computers 31A to 31E. The printer 11 performs a printing process via the print server 32. However, the present invention should not be limited only to the above-mentioned procedure. The personal computers 31A to 31E acting as terminals may request directly the printer 11 to perform a printing operation. In this case, needless to say, the configuration can obtain the same function and effect as those in the embodiment.

What is claimed is:

1. A printer connected to a network, comprising:
    a print execution unit printing on a predetermined paper as actual printing; and
    a control unit controlling the operation of said print execution unit in response to a plurality of print jobs transmitted via the network, each print job comprising one or more pages,
    wherein said control unit comprises a plurality of logical printers each virtually printing on a page-by-page basis and the control unit controls said print execution unit to actually print in such a manner that each time any one of said logical printers has completed virtually printing 2. The printer according to claim 1, wherein each logical printer comprises:
    a logical hopper virtually feeding paper in the virtual printing, and
    a logical stacker virtually receiving the virtually printed paper in the virtual printing, and
    said logical hopper and said logical stacker are associated with an actual physical hopper and an actual physical stacker, respectively, during the actual printing.

3. The printer according to claim 1, wherein a desired communication protocol is set individually for each logical printer.

4. The printer according to claim 1, wherein a desired printer emulation is set individually for each logical printer.

5. The printer according to claim 1, wherein when an abnormal state occurs at any one of said plural logical printers, only the abnormal logical printer is stopped.

6. The printer according to claim 1, wherein various setting conditions for the actual and the virtual printing are set by an external terminal connected to the network.

7. The printer according to claim 2, wherein a correspondence between said actual physical hopper and said logical hopper and a correspondence between said actual physical stacker and said logical stacker are set by an external terminal connected to the network.

8. The printer according to claim 3, wherein the desired communication protocol for each logical printer is set by an external terminal.

9. The printer according to claim 4, wherein the desired printer emulation is set by an external terminal connected to the network.

10. A printer, connected to a network, said printer comprising:
    a control unit comprising a plurality of logical printers individually virtually printing upon receipt of individual print jobs so that the resultant virtually-printed pages are made on a page-by-page basis corresponding to one or more pages included in the individual print jobs; and
    a print execution unit actually printing on a paper based on receipt of the individual virtually printed pages:
    wherein said control unit controls said print execution unit in sequence of receipt of the virtually printed pages by the individual logical printers.

11. The printer according to claim 10,
    wherein said print execution unit comprises:
        a physical hopper holding one or more sheets of paper to be printed thereon, and
        a physical stacker receiving the actually printed sheets of paper; and wherein each logical printer comprises:
        a logical hopper holding one or more virtually printed pages, and
        a logical stacker receiving the virtually printed pages; and
    said physical hopper and said physical stacker are associated with said logical hopper and said logical stacker, respectively.

12. The printer according to claim 10, wherein each logical printer is set to handle a desired communication protocol.

13. The printer according to claim 10, wherein each logical printer is set to handle a desired printer emulation.

14. The printer according to claim 10, wherein when an error occurs at any one of said logical printers, only the logical printer with the error is stopped.

15. The printer according to claim 10, wherein various setting conditions for both the logical printer and the virtual printer are set remotely by a computer connected to the network.

16. The printer according to claim 11, wherein a correspondence between said physical hopper and said logical hopper, and a correspondence between said physical stacker and said logical stacker are set remotely by a computer connected to the network.

17. The printer according to claim 12, wherein the desired protocol handled by each logical printer is set remotely by a computer connected to the network.

18. The printer according to claim 13, wherein the printer emulation handled by each logical printer is set remotely by a computer connected to the network.

19. A printer, connected to a network, said printer comprising:
    a print execution unit printing on a paper, and
    a control unit controlling the print execution unit, comprising:
        a plurality of logical printers, each virtually printing upon receipt of each print job; and
        a plurality of logical printer controllers, each connected to each logical printer, and handing over each virtually printed page corresponding to one or more pages of each print job from any one of the logical printers virtually printing, to the print execution unit on a page-by-page basis, thereby controlling the print execution unit to print on the paper based on receipt of earliest finished virtually printed page by any one of the logical printers and handed over to the print execution unit by each logical printer controller.

* * * * *

UNITED STATES PATENT AND TRADEMARK OFFICE
CERTIFICATE OF CORRECTION

PATENT NO. : 6,775,019 B1
DATED : August 10, 2004
INVENTOR(S) : Kazuhiko Sakurai et al.

It is certified that error appears in the above-identified patent and that said Letters Patent is hereby corrected as shown below:

Column 11,
Line 40, after "printing", insert -- one page, said execution unit actually prints the one page. --

Signed and Sealed this

Twenty-eighth Day of December, 2004

JON W. DUDAS
*Director of the United States Patent and Trademark Office*